(12) United States Patent
Daidoji et al.

(10) Patent No.: US 8,491,673 B2
(45) Date of Patent: Jul. 23, 2013

(54) METHOD FOR PRODUCTION OF STACKED BATTERY

(75) Inventors: Takao Daidoji, Sendai (JP); Tomokazu Kumeuchi, Sendai (JP); Koichi Zama, Sendai (JP)

(73) Assignee: NEC Energy Devices, Ltd., Sagamihara-shi (JP)

( * ) Notice: Subject to any disclaimer, the term of this patent is extended or adjusted under 35 U.S.C. 154(b) by 1009 days.

(21) Appl. No.: 11/896,972

(22) Filed: Sep. 7, 2007

(65) Prior Publication Data

US 2008/0060189 A1  Mar. 13, 2008

(30) Foreign Application Priority Data

Sep. 8, 2006 (JP) ................................. 2006-243827

(51) Int. Cl.
*H01M 4/82* (2006.01)
*H01M 6/42* (2006.01)

(52) U.S. Cl.
USPC ........................................ 29/623.1; 429/149

(58) Field of Classification Search
USPC .................. 29/623.1; 429/162, 136, 149, 156, 429/157, 158, 160
See application file for complete search history.

(56) References Cited

U.S. PATENT DOCUMENTS

2004/0127952 A1   7/2004   O'Phelan et al.

FOREIGN PATENT DOCUMENTS

| JP | 50-134147 A | 10/1975 |
| JP | 9-213299 A | 8/1997 |
| JP | 9213299 A | 8/1997 |
| JP | 2006-159204 A | 6/2006 |
| WO | WO 2007/042892 A | 4/2007 |

OTHER PUBLICATIONS

Search Report in EP 07115916.4, issued Apr. 18, 2008.
Japanese Office Action dated May 11, 2012, issued in corresponding Japanese Patent Application No. 2006-243827, (4 pages).

*Primary Examiner* — Ula C. Ruddock
*Assistant Examiner* — Thomas H. Parsons
(74) *Attorney, Agent, or Firm* — Westerman, Hattori, Daniels & Adrian, LLP

(57) ABSTRACT

A method for production of a stacked battery having a step of determining in advance a simultaneously bondable number of electrode current collection tabs and a step of forming groups of current collection tabs, and a step of displacing the bonding positions of the groups of positive electrode current collection tabs or those of negative electrode current collection tabs relative to each other in the direction of drawing out the positive electrode current collection tabs or the negative electrode current collection tabs, or in the direction perpendicular to the direction and collectively bonding the positive electrode current collection tabs or the negative electrode current collection tabs, of each group under the bonding conditions.

4 Claims, 11 Drawing Sheets

METHOD FOR PRODUCTION OF STACKED BATTERY

CROSS-REFERENCE TO RELATED APPLICATIONS

This application is based upon and claims the benefit of priority from prior Japanese Patent Application No. 2006-243827, filed Sep. 8, 2006, the entire contents of which are incorporated herein by reference.

BACKGROUND

1. Technical Field

This invention relates to a method for production of a stacked battery. More particularly, the present invention relates to a method for production of a stacked battery that is suitable for production of a stacked lithium-ion battery where a plurality of current collection tabs of positive electrodes and negative electrodes are connected in parallel.

2. Related Art

Lithium ion batteries have been used in portable appliances such as portable telephones and digital cameras to meet the demand for downsized high capacity power sources. Additionally, lithium ion batteries are being used as high energy density power sources having no memory effect for electric bicycles and electric tools. Power sources of such portable appliances are required to be downsized and accordingly lithium ion batteries are required to be designed as downsized and flat batteries.

Besides, stacked lithium ion batteries formed by laying one on the other a plurality of plate-shaped positive electrodes and negative electrodes with separators interposed between them, connecting in parallel current collection tabs that are connected respectively to them and being covered by a flexible film casing that provides advantages from the viewpoint of energy density of battery are also being used.

FIGS. 13A and 13B of the accompanying drawings schematically illustrate a known stacked lithium-ion battery before covered by a flexible film casing.

FIG. 13A is a schematic perspective view of the stacked battery and FIG. 13B is a perspective view thereof, illustrating how it appears after welding the current collection tabs and the lead terminals.

Referring to FIGS. 13A and 13B, a plurality of positive electrodes 4 and a plurality of negative electrodes 6 are laid alternately one on the other as so many plates with separators 5 interposed between them to produce a stacked member 2 that operates as a battery element.

As shown in FIG. 13B, the positive electrode current collection tabs 7 and the negative current collection tabs 8 are bonded respectively to a positive electrode lead terminal 9 and a negative electrode lead terminal 10 at respective junctions 11, 12. These components are covered by a flexible film casing (not shown).

Normally, the positive electrode current collection tabs 7 and the negative electrode current collection tabs 8 are bonded respectively to positive lead terminal 9 and negative lead terminal 10 by ultrasonic welding. Each of them is pinched by an anvil and a welding chip and ultrasonically welded. When connecting the current collection tabs and the lead terminals, the welding conditions vary according to the number of current collection tabs that are put together and hence it is conventionally necessary to determine the optimum conditions of the welding apparatus each time the number of current collection tabs is changed. Additionally, in the case of a stacked lithium-ion battery, the thickness of a single current collection tab is as small as several micrometers to tens of several micrometers so that current collection tabs can be cut and broken when large welding energy is input for an increased number of current collection tabs that are to be welded. In other words, there arises a problem that current collection tabs are apt to be cut and broken when a large number of tabs are welded collectively.

A battery where a plurality of lead wires are connected to current collectors is proposed in JP-A-9-213299. The above-cited patent document discloses that at least three connection surfaces are formed to connect lead wires to a current collection terminal and the lead wires of an electrode plate are connected to the respective connection surfaces to prevent the electrode plate from being damaged as a result of forcibly bending lead wires.

Since the required optimum welding conditions vary as a function of the number of current collection tabs to be welded when welding positive and negative electrode current collection tabs to lead terminals in known stacked lithium ion batteries, it is conventionally necessary to determine the optimum conditions of the welding apparatus each time the number of current collection tabs is changed. Additionally, the strength for withstanding welding such as ultrasonic welding of a current collection tab whose thickness is as small as several micrometers to tens of several micrometers is obviously limited and hence there arises a problem that particularly the endmost current collection tab can highly probably be cut and broken in a welding process when the number of current collection tabs becomes large.

Thus, the present invention provides a method for production of a stacked battery with which the current collection tabs can be welded stably. More particularly, it is an object of the present invention to provide a method for production of a stacked battery that does not require any study of the optimum welding conditions each time the number of current collection tabs to be stacked is increased and makes it possible to stably weld current collection tabs without cutting and breaking any of the current collection tabs when the number of current collection tabs is increased.

Another object of the present invention is to provide a method for production of a stacked battery that allows the number of layers of a stacked member to be increased without changing the welding conditions of welding thin belt-shaped positive electrode current collection tabs or negative electrode current collection tabs to a lead terminal for stacked batteries of a number of different types whose number of layers of positive electrodes and negative electrodes for forming the stacked member varies.

SUMMARY

In the first aspect of the present invention, the above objects and other objects of the invention are achieved by providing a method for production of a stacked battery having a plurality of positive electrode current collection tabs and a plurality of negative electrode current collection tabs drawn out from a stacked member formed by laying positive electrodes and negative electrodes alternately one on the other with separators interposed between them and bonded respectively to a positive lead terminal and a negative lead terminal, the method including: a step of determining in advance a simultaneously bondable number, or the number of positive electrode current collection tabs and the number of negative electrode current collection tabs that can be laid one on the other and collectively bonded, and bonding conditions for bonding them; and a step of forming groups of current collection tabs, each group being formed by laying a number of current collection tabs not exceeding the simultaneously bondable number one on the other, displacing the bonding positions of the groups of positive electrode current collection tabs or those of negative electrode current collection tabs relative to each other in the direction of drawing out the positive electrode current collection tabs or the negative electrode current collection tabs, whichever appropriate, or in a direction perpendicular to the direction on the surface of the positive lead terminal or the negative lead terminal, whichever appropriate, and collectively bonding the positive electrode current collection tabs or the negative electrode current collection tabs of each group under the bonding conditions.

Thus, with a method for production of a stacked battery in the first aspect of the present invention as defined above, when the positive electrode current collection tabs and the negative electrode current collection tabs drawn out from the stacked member and negative electrodes are formed by laying positive electrodes alternately one the other with separators interposed between them and are connected respectively to the positive electrode lead terminal and the negative electrode lead terminal, groups of current collection tabs are formed by laying one on the other current collection tabs up to the simultaneously bondable number or a number less than the simultaneously bondable number for each of the groups so as to make the current collection tabs of each group simultaneously bondable under the established conditions and the positions of the groups of positive electrode current collection tabs are displaced from each other longitudinally or transversally, while the positions of the groups of negative electrode current collection tabs are also displaced from each other longitudinally or transversally. With this arrangement, it is possible to connect the current collection tabs of each group under the established welding conditions if the number of current collection tabs to be connected to the positive lead terminal and the negative lead terminal is increased.

In the second aspect of the invention, in a method for production of a stacked battery as defined above, preferably the number of positive electrode current collection tabs or negative electrode current collection tabs for forming a group is determined independently for positive electrode current collection tabs and negative electrode current collection tabs depending on their respective materials and profiles.

Thus, with a method for production of a stacked battery in the second aspect of the invention, any number not less than two can be selected for the number of current collection tabs of each group in a step of forming groups of current collection tabs laying one on the other current collection tabs up to the simultaneously bondable number or a number less than the simultaneously bondable number for each of the groups so as to make the current collection tabs of each group simultaneously bondable under the established conditions. Additionally, the current collection tabs can be connected under the established welding conditions including the condition of welding energy.

When the amount of energy required for welding positive electrode current collection tabs differs from that of energy required for welding negative electrode current collection tabs or the welding conditions for welding positive electrode current collection tabs differ from those for welding negative electrode current collection tabs in terms of thickness and width of current collection tabs, for example, the number of positive electrode current collection tabs for forming a group may be differentiated from that of negative electrode current collection tabs for forming a group.

In the third aspect of the invention, in a method for production of a stacked battery as defined above, preferably each group is formed by taking out every other or every plural number of positive electrode current collection tab or negative electrode current collection tab in the stacked direction of the stacked member.

Thus, with a method for production of a stacked battery in the third aspect of the invention, each group of positive electrode current collection tabs or negative electrode current collection tabs are formed by stacking a number of current collection tabs less than the predetermined number for stacking and positive electrode current collection tabs or negative electrode current collection tabs are not taken out consecutively from positive electrodes or negative electrodes, whichever appropriate, and laid one on the other in the stacked member but every other or every plural number of current collection tab is taken out to form a group. Then, the positions of the groups of current collection tabs are displaced from each other. With this arrangement, it is possible to make the positive electrode lead terminal and the negative electrode lead terminal less liable to incline relative to the stacked member.

In the fourth aspect of the invention, in a method for production of a stacked battery as defined above, preferably the junctions of the groups of positive electrode current collection tabs or the groups of negative electrode current collection tabs and the positive electrode lead terminal or the negative electrode lead terminal, whichever appropriate, are arranged with respective differentiated distances from the stacked member on the surface of the positive electrode lead terminal or the negative electrode lead terminal, whichever appropriate, without displacing the positions in the direction perpendicular to the directions of drawing out the positive electrode current collection tabs or the negative electrode current collection tabs, whichever appropriate, of the groups and the groups of positive electrode current collection tabs or the groups of negative electrode current collection tabs, whichever appropriate, are bonded sequentially in the order of closeness to the positive electrode lead terminal surface or the negative electrode lead terminal surface, whichever appropriate, as viewed from the side close to toward the side remote from the stacked member.

Thus, with a method for production of a stacked battery in the fourth aspect of the invention, the positions of the groups of positive electrode current collection tabs or those of the groups of negative electrode current collection tabs drawing out from the stacked member are not displaced in the respective directions of drawing out from the stacked member but the lengths of the current collection tabs are differentiated so as to connect them to the positive electrode lead terminal or the negative electrode lead terminal, whichever appropriate, at different positions on the same surface thereof sequentially in the order of closeness as viewed from the side close to toward the side remote from the stacked member.

In the fifth aspect of the invention, in a method for production of a stacked battery as defined above, preferably the junctions with the groups of positive electrode current collection tabs or the groups of negative electrode current collection tabs are arranged on the both surfaces of the positive electrode lead terminal or the negative electrode lead terminal, whichever appropriate, without displacing the positions in the direction perpendicular to the directions of drawing out the positive electrode current collection tabs or the negative electrode current collection tabs, whichever appropriate, of the groups in such a way that the projections of the junctions on the positive electrode lead terminal surfaces or the negative electrode lead terminal surfaces, whichever appropriate, do not mutually overlap and the current collection tabs are connected alternately to the front surface and the rear surface, starting from a junction at the side closer to the stacked member.

Thus, with a method for production of a stacked battery in the fifth aspect of the invention, the position of the positive electrode lead terminal and that of the negative electrode lead terminal are arranged at the middle of the stacked member in the elevating direction thereof in a step of connecting the groups of current collection tabs at positions differentiated in the longitudinal direction by differentiating the lengths of the current collection tabs without displacing the positions of the groups of current collection tabs in a direction perpendicular to the direction of drawing out the tabs so that the current collection tabs are connected alternately to the front surface and the rear surface, starting from a junction at the side close to the stacked member.

In the sixth aspect of the invention, in a method for production of a stacked battery as defined above, preferably a plurality of junctions are formed on the positive electrode lead terminal or the negative electrode lead terminal in a direction perpendicular to the direction of drawing out the positive electrode current collection tabs or the negative electrode current collection tabs, whichever appropriate, and width of the positive electrode lead terminal or the negative electrode lead terminal, whichever appropriate, at the stacked member side thereof is same as the width of the outer surface of the battery.

Thus, with a method for production of a stacked battery in the sixth aspect of the invention, the width of either of the lead terminals is broadened according to the width by which the current collection tabs are welded to produce a cross sectional area of the lead terminal that can flow a larger electric current in a step of connecting the positive electrode current collection tabs and the negative electrode current collection tabs respectively to the positive electrode lead terminal and the negative electrode lead terminal.

In the seventh aspect of the invention, in a method for production of a stacked battery as defined above, preferably a plurality of junctions are formed on the positive electrode lead terminal or the negative electrode lead terminal in a direction perpendicular to the direction of drawing out the positive electrode current collection tabs or the negative electrode current collection tabs, whichever appropriate, and the width of the positive electrode lead terminal or the negative electrode lead terminal, which ever appropriate, and the width of the outer surface of the battery are made greater than the width of the stacked member so as to make the lead terminal T-shaped, asymmetrically T-shaped or L-shaped.

Thus, with a method for production of a stacked battery in the seventh aspect of the invention, the width of the lead terminal is broadened according to the welding width of the current collection tabs in a step of connecting the positive electrode current collection tabs and the negative electrode current collection tabs respectively to the positive electrode lead terminal and the negative electrode lead terminal.

When the battery is used in an application where it is not necessary to flow a large electric current, is possible to improve the reliability of the sealed section by reducing the length of the projection of the thermally welded section of the flexible film casing of the lead terminal. Additionally, the profile of the lead terminal can be made T-shaped, L-shaped or transversally asymmetrical in terms of the length from the center to the transversal edge of the lead terminal depending on the position where the lead terminal is drawn out from the flexible film casing.

In the eighth aspect of the invention, there is provided a method for production of a stacked battery having a plurality of positive electrode current collection tabs and a plurality of negative electrode current collection tabs drawn out from a stacked member formed by laying alternately positive electrodes and negative electrodes alternately one on the other with separators interposed between them and bonded respectively to a positive lead terminal and a negative lead terminal, the method including: a step of determining in advance the maximum number of positive electrode current collection tabs and the maximum number of negative electrode current collection tabs that can be laid one on the other and bonded together and bonding conditions for bonding them; and a step of forming groups of current collection tabs, each group being formed by laying one on the other positive electrode current collection tabs or negative electrode current collection tabs drown out from the stacked member, displacing one by one or a plurality of current collection tabs by a plurality of current collection tabs so as to make an upper current collection tab or a plurality of upper current collection tabs partly overlap a lower current collection tab or a plurality of lower current collection tabs, whichever appropriate, and defining the extent of displacement so as to make the largest number of overlapping current collection tabs not exceed the maximum number and bonding the positive electrode current collection tabs or the negative electrode current collection tabs of each group under the bonding conditions of each overlapping part.

Thus, with a method for production of a stacked battery in the eighth aspect of the present invention as defined above, the current collection tabs drawn out from the stacked member are displaced in such a way that an upper current collection tab or a plurality of upper current collection tabs partly overlap a lower current collection tab or a plurality of lower current collection tabs and the largest number of stacked current collection tabs in any overlapping part does not exceed the maximum number that can be welded under the predefined bonding conditions.

Thus, according to the present invention, it is now possible to stably weld and connect positive electrode current collection tabs and negative electrode current collection tabs respectively to a positive electrode lead terminal and a negative electrode lead terminal regardless of the number of positive electrode current collection tabs and the number of negative electrode current collection tabs so that it is possible to increase the number of current collection tabs that are laid one on the other in a stacked battery without damaging the current collection tabs and the reliability of the stacked battery.

BRIEF DESCRIPTION OF THE DRAWINGS

The invention will be described with reference to the accompanying drawings, wherein like numbers reference like elements.

FIG. 11A shows a T-shaped profile and FIG. 11B shows an L-shaped profile, whereas FIG. 11C shows an asymmetrically T-shaped profile;

DESCRIPTION OF THE EXEMPLARY EMBODIMENTS

Now, embodiments of the present invention will be described below by referring to the accompanying drawings.

Figure 1:
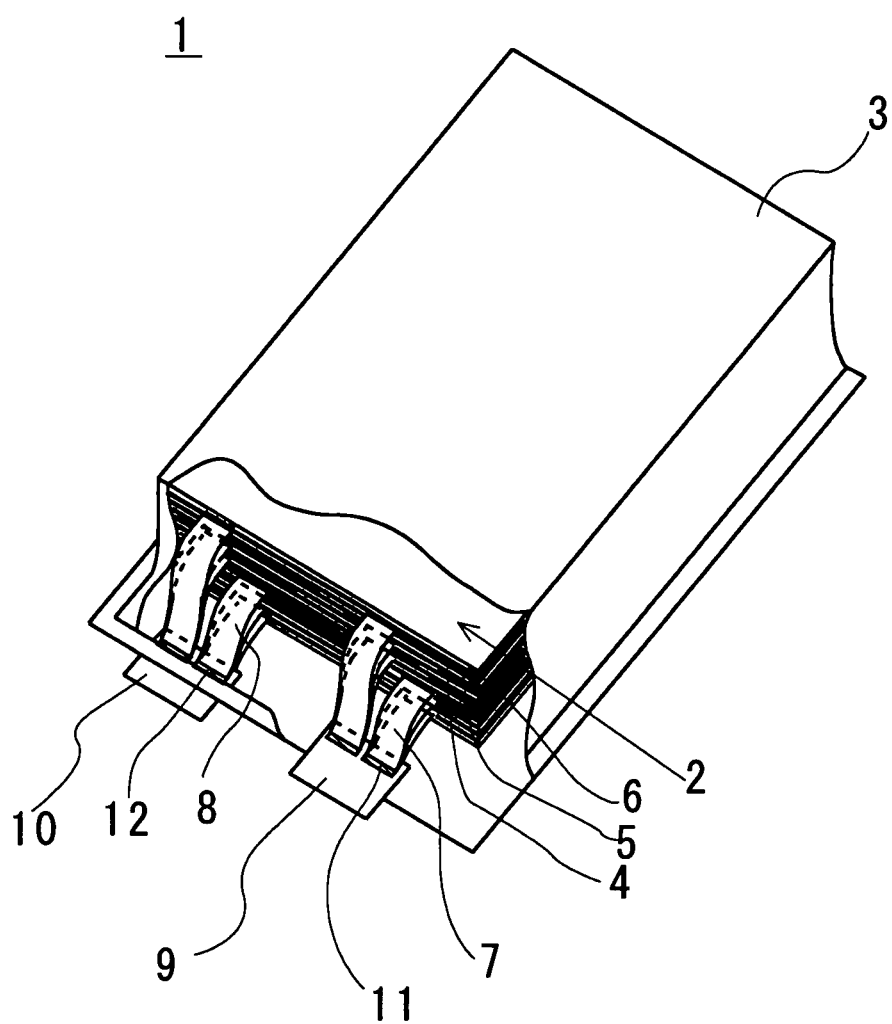
FIG. 1 is a partly cut out schematic perspective view of the first embodiment of a stacked battery according to the present invention.

FIG. 1 is a partly cut out schematic perspective view of the first embodiment of a stacked battery according to the present invention. The stacked member of the stacked battery is illustrated in detail in FIG. 3B.

The stacked battery 1 is formed by covering the stacked member 2 formed by laying positive electrodes 4 and negative electrodes one on the other with separators 5 interposed between them with a flexible film casing 3. In the stacked battery 1, the positive electrode current collection tabs 7 that are bonded to the positive electrodes 4 are connected to the positive electrode lead terminal 9 at the junction 11.

Similarly, the negative electrode current collection tabs 8 that are bonded to the negative electrodes 6 are connected to the welding section 12 of the negative electrode lead terminal 10 and thermally welded to and sealed by the flexible film casing 3.

In the following description, it is assumed that a stacked battery according to the invention is a stacked lithium-ion battery.

Figure 2:
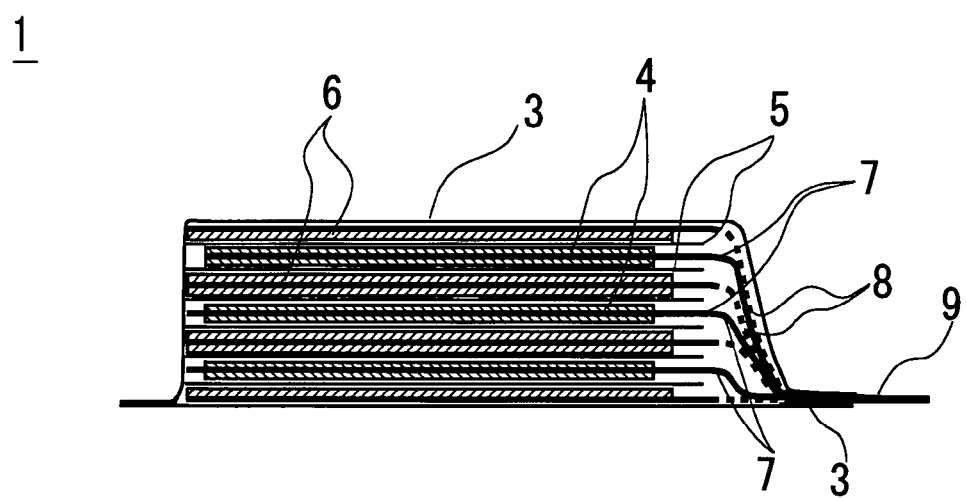
FIG. 2 is a schematic cross sectional view of a stacked battery according to the present invention that is a stacked lithium-ion battery.

FIG. 2 is a schematic cross sectional view of a stacked lithium-ion battery taken along the positive electrode lead section thereof. Firstly, a positive electrode activating substance such as $LiMn_2O_4$ that occludes and releases lithium ions is applied onto positive electrode collectors that are made of aluminum foil except the positive electrode current collection tabs drawn out from the positive electrode collectors to produce positive electrodes 4 from which positive electrode current collection tabs are drawn out.

Similarly, a negative electrode activating substance such as graphite that occludes and releases lithium ions is applied onto negative electrode collectors that are made of copper coil except the negative electrode current collection tabs drawn out from the negative electrode collectors to produce negative electrodes 6 from which negative electrode current collection tabs 8 are drawn out.

The negative electrodes 6 are made to have an area greater than the positive electrodes 4 and separators 5 by turn have an area greater than the negative electrodes 6. The negative electrodes 6 are arranged by a predetermined number in such a way that a negative electrode 6 is found without fail on a separator at the opposite side projection surface of a positive electrode. In this way, the positive electrodes 4, the negative electrodes 6 and the separators 5 are laid one on the other to form a stacked member 2. Porous polypropylene film having a three-layer structure of polypropylene/polyethylene/polypropylene may be used for the separators.

Thereafter, positive electrode current collection tabs 7 and negative electrode current collection tabs 8 are bonded respectively to the positive electrode lead terminal 9 and the negative electrode lead terminal 10 (not shown) by using welding means such as ultrasonic welding to establish conductive connections.

Figure 3A:
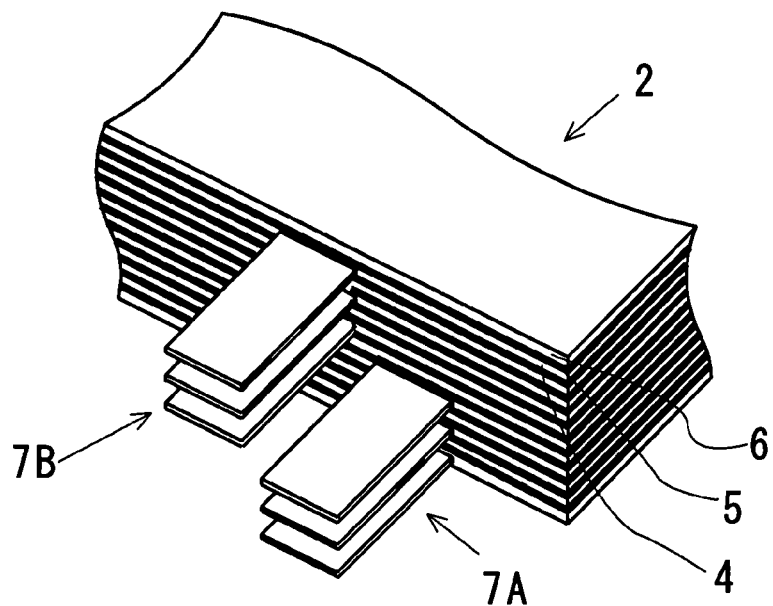
FIG. 3A is a schematic perspective view of part of the first embodiment of a stacked battery according to the present invention and FIG. 3B is a schematic perspective view of part of the first embodiment of a stacked battery, illustrating the condition after welding the current collection tabs and the lead terminals.
Figure 3B:
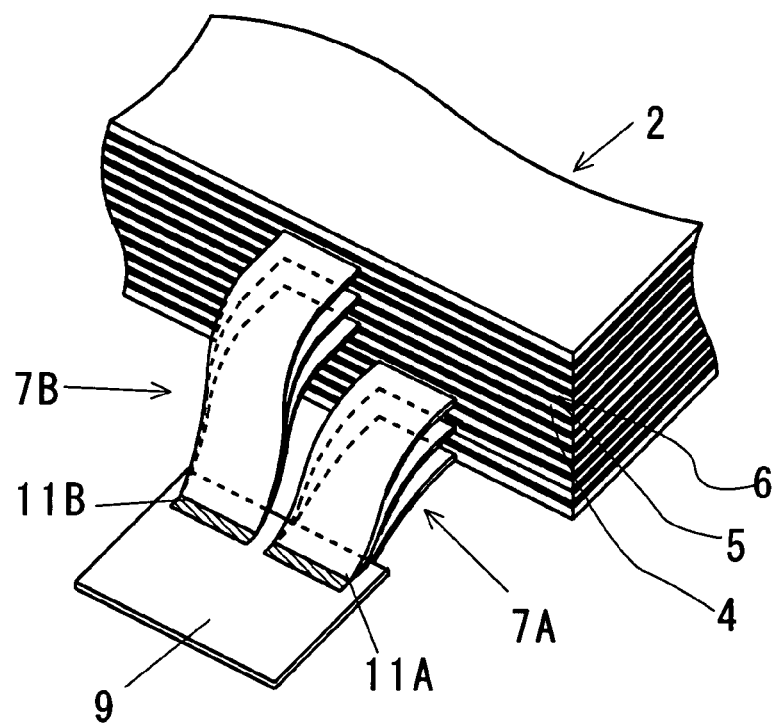

FIG. 3A is a schematic perspective view of part of the first embodiment of a stacked battery according to the present invention and FIG. 3B is a schematic perspective view of part of the first embodiment of a stacked battery, illustrating the condition after welding the current collection tabs and the lead terminals.

Note that, while FIGS. 3A and 3B illustrate the connection structure of the positive electrode current collection tabs and the positive electrode lead terminal, the terminal connection structure of the negative electrode side is similar to that of the positive electrode side and hence only the connection structure of the positive electrode side will be described hereinafter for all the embodiments hereinafter. For the purpose of simplicity of illustration, the positive electrodes, the separators and the negative electrodes are all drawn with the same size for all the embodiments.

In this embodiment of a stacked battery according to the present invention, a number of current collection tabs that can be stably and reliably welded to a lead terminal are taken as a group and the positions of groups of current collection tabs are displaced from each other.

More specifically, when positive electrodes 4 and negative electrode 6 are laid one on the other with separators 5 interposed between them to form a stacked member 2, the positive electrode current collection tabs 7 are arranged in such a way that the positive electrode current collection tabs 7 can be divided into first group of positive electrode current collection tabs 7A and second group of positive electrode current collection tabs 7B and the two groups can be separated from each other by a gap in a direction orthogonal relative to the direction in which the positive electrode current collection tabs 7 are taken out.

Then, the first group of positive electrode current collection tabs 7A and the second group of positive electrode current collection tab 7B are bonded to the positive electrode lead terminal 9 at respective junctions 11A, 11B to establish conductive connections. As the first group of positive electrode current collection tabs 7A and the second group of positive electrode current collection tabs 7B are separated from each other, it is possible to produce a stacked battery in which positive electrodes and negative electrodes that are twice as many as the number of current collection tabs that can be bonded at a single junction are laid one on the other. The prepared stacked member 5 is covered by a flexible film casing having a multilayer structure formed by laying synthetic resin film on both surfaces of a metal thin film such as an aluminum foil.

The predefined welding conditions for bonding the first positive electrode current collection tabs and the positive electrode lead terminal to each other include the pressure to be applied, the welding power and the maximum number of positive electrode current collection tabs that can be reliably welded together. Then, the positive electrode current collection tabs are welded in two groups to the two junctions without altering the welding conditions. In other words, it is possible to weld the groups continuously within a short period of time without newly defining welding conditions for the group that is welded later.

Figure 4:
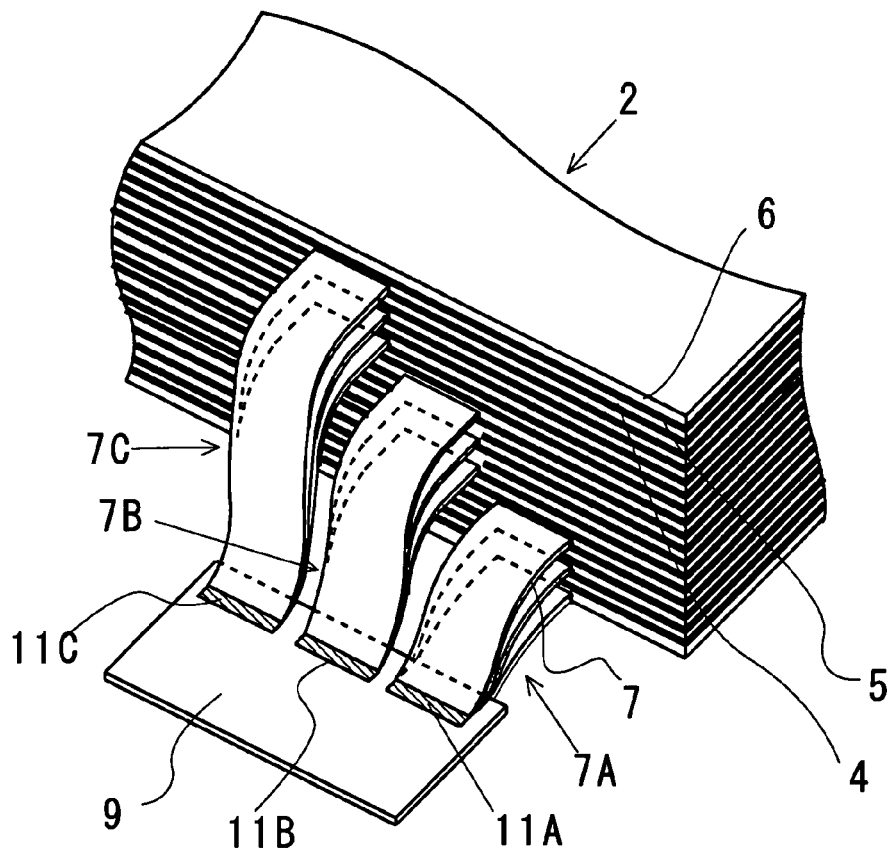
FIG. 4 is a schematic perspective view of part of the second embodiment of a stacked battery according to the present invention after welding the current collection tabs and the lead terminals.

FIG. 4 is a schematic perspective view of part of the second embodiment of a stacked battery according to the present invention after welding the positive electrode current collection tabs and the positive electrode lead terminals.

When positive electrodes 4 and negative electrode 6 are laid one on the other with separators 5 interposed between them to form a stacked member 2, the positive electrode current collection tabs are arranged in such a way that the positive electrode current collection tabs 7 can be divided into first group of positive electrode current collection tabs 7A, second group of positive electrode current collection tabs 7B and third group of positive electrode current collection tabs 7C and any two adjacently located two groups can be separated from each other by a gap in a direction orthogonal relative to the direction in which the positive electrode current collection tabs 7 are taken out.

Then, the first group of positive electrode current collection tabs 7A, the second group of positive electrode current collection tab 7B and the third group of positive electrode current collection tabs 7C are bonded to the positive electrode lead terminal 9 at respective junctions 11A, 11B and 11C to establish conductive connections.

This embodiment shows that, if the number of current collection tabs that can be bonded properly is only three, current collection tabs three times as many as that number can be laid one on the other when they are divided into three groups. Similarly, positive electrode current collection tabs and negative electrode current collection tabs four times as many as the number of current collection tabs that can be bonded properly can be laid one on the other when they are divided into four groups and so on.

Figure 5:
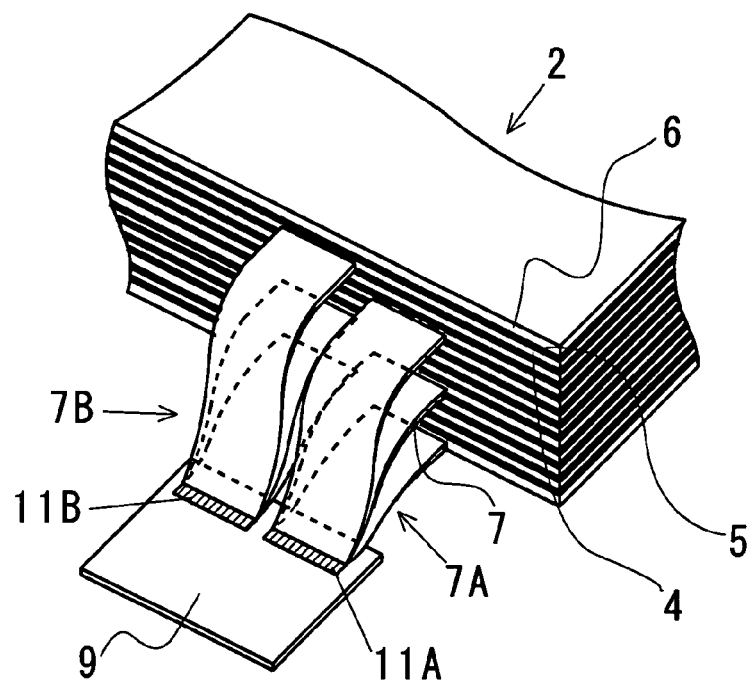
FIG. 5 is a schematic perspective view of part of the third embodiment of a stacked battery according to the present invention after welding the current collection tabs and the lead terminals.

FIG. 5 is a schematic perspective view of part of the third embodiment of a stacked battery according to the present invention after welding the current collection tabs and the lead terminals.

The positive electrode current collection tabs are divided into groups in the direction in which the positive electrodes of the stacked member are laid in the first embodiment.

On the other hand, in the third embodiment, every other positive electrode current collection tab is, in other words the second, the fourth and the sixth positive electrode current collection tabs 7 are, taken and laid one on the other to form the first group of positive electrode current collection tabs 7A. Similarly, the first, the third and the fifth positive electrode current collection tabs 7 are taken and laid one on the other to form the second group of positive electrode current collection tabs 7B.

The positions for drawing out the positive electrode current collection tabs 7 are not lopsided and uniformly distributed in the stacked member 2 of this embodiment. Thus, the positive electrode lead terminal 7 can be placed in parallel with the stacked member 5 with ease in the assembling process.

Figure 6A:
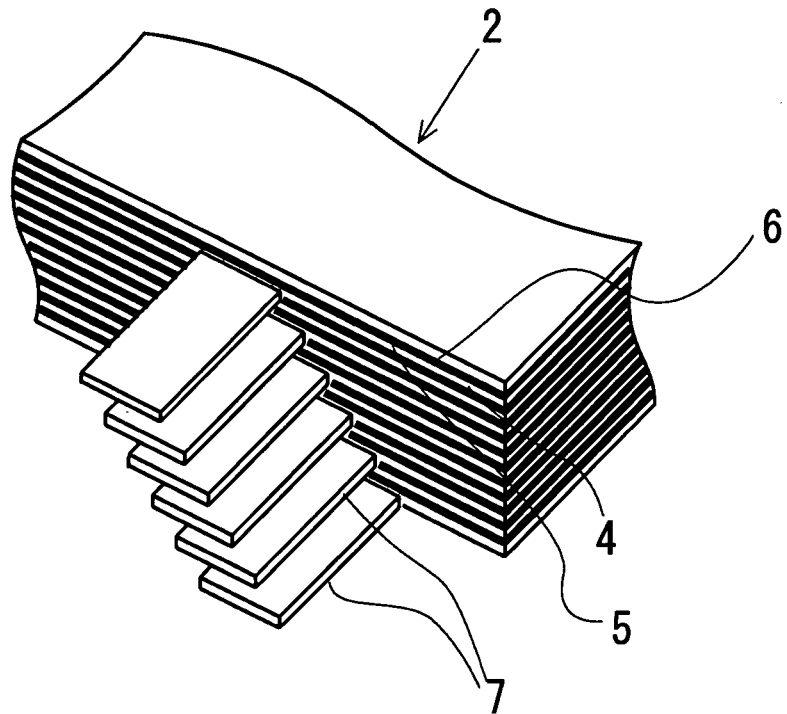
FIG. 6A is a schematic perspective view of part of the fourth embodiment of a stacked battery according to the present invention and FIG. 6B is a schematic perspective view of part of the fourth embodiment of a stacked battery, illustrating the condition after welding the current collection tabs and the lead terminals.
Figure 6B:
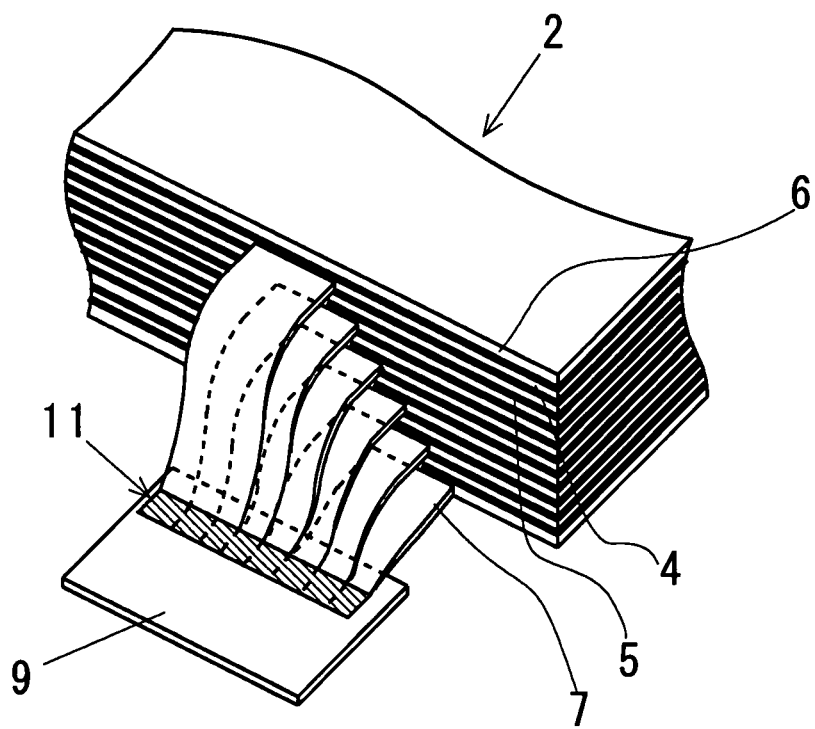

FIG. 6A is a schematic perspective view of part of the fourth embodiment of a stacked battery according to the present invention and FIG. 6B is a schematic perspective view of part of the fourth embodiment of a stacked battery, illustrating the condition after bonding the positive electrode current collection tabs and the positive electrode lead terminals.

In this embodiment, the positive electrode current collection tabs 7 drawn out from the stacked member 2 are sequentially and slightly shifted in a direction perpendicular to the direction in which the positive electrode current collection tabs are drawn out in such a way that the current collection tabs partly overlap each other.

While the positive electrode current collection tabs are sequentially shifted one by one in FIG. 6A, alternatively two consecutive positive electrode current collection tabs may be arranged at the same position to form a group and groups of current collection tabs may be sequentially and slightly shifted.

FIG. 6B shows the positive electrode current collection tabs 7 that are sequentially and slightly shifted are bonded to the positive electrode lead terminal 9 at the junction 11.

It is preferable that the extent to which each positive electrode current collection tab is shifted is defined in such a way that positive electrode current collection tabs are stably bonded to the positive electrode lead terminal 9 at the junction in the area where the number of positive electrode current collection tabs that overlap becomes largest.

It is not necessary to bond all the positive electrode current collection tabs entirely at the junction 11 at the same time. In other words, regions, or sections, for bonding different numbers of overlapping positive electrode current collection tabs 7 may be formed in the junction. In FIG. 6B, six positive electrode current collection tabs 7 are shifted from each other and hence a total of eight sections are formed in the junction 11.

The largest number of overlapping positive electrode current collection tabs 7 in those sections is three. Positive electrode current collection tabs 7 can be bonded in each section under the predefined welding conditions. A composite welding head that can weld current collection tabs in a plurality of sections simultaneously may be used for the bonding.

A total of six positive electrode current collection tabs 7 are laid one on the other in the above description. However, according to the present invention, a process change can be realized quickly for a stacked battery having a different number of electrodes, or current collection tabs, that are laid one on the other because any number of positive electrode current collection tabs can be bonded under the predefined welding conditions by changing the extent to which the positive electrode current collection tabs 7 are sequentially shifted according to the number of positive electrode current collection tabs.

Figure 7:
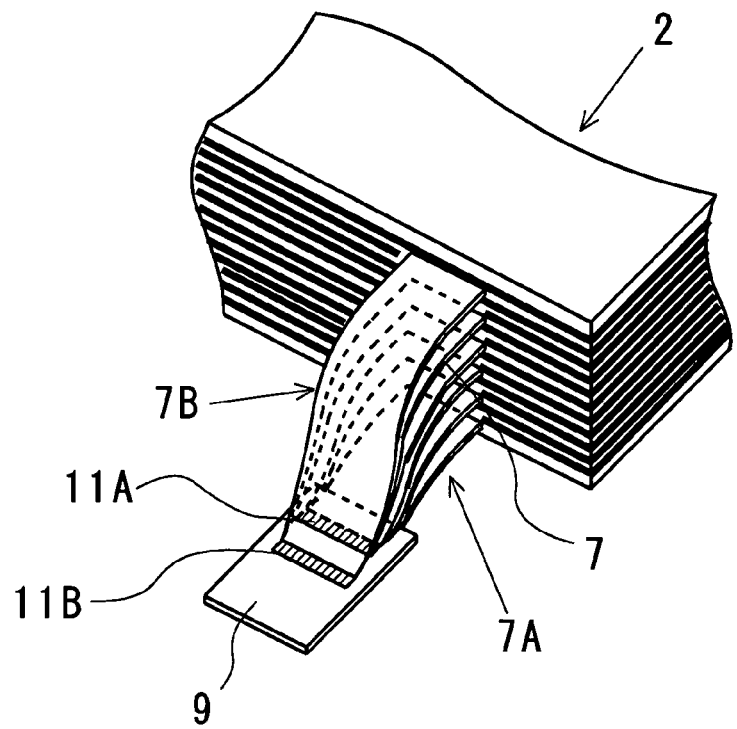
FIG. 7 is a schematic perspective view of the fifth embodiment of a stacked battery, illustrating the connection structure of the current collection tabs and the lead terminals.

FIG. 7 is a schematic perspective view of part of the fifth embodiment of a stacked battery, illustrating the connection structure of the positive electrode current collection tabs and the positive electrode lead terminal.

While, the positive electrode current collection tabs of the stacked battery are shifted in a direction perpendicular to the direction in which the positive electrode current collection tabs are taken out in each of the first through fourth embodiment of a stacked battery, the positive electrode current collection tabs 8 of the stacked battery of the fifth embodiment are drawn out from the respective positive electrodes 4 of the stacked member 2 without being shifted in a direction perpendicular to the direction in which the positive electrode current collection tabs 7 are taken out.

On the other hand, the lengths of the positive electrode current collection tabs 7 that are drawn out are differentiated. More specifically, the positive electrode current collection tabs 7 are divided into the first group of positive electrode current collection tabs 7A having a small length and the second group of positive electrode current collection tabs 7B having a large length.

Then, the first group of positive electrode current collection tabs 7A is arranged at the lower layer side of the stacked member, while the second group of positive electrode current collection tabs 7B is arranged at the upper layer side of the stacked member. The first group of positive electrode current collection tabs 7A is bonded to the positive electrode lead terminal 9 at the first junction 11A, while the second group of positive electrode current collection tabs 7B is bonded to the positive electrode lead terminal 9 at the second junction 11A that is separated from the first junction 11A by a gap.

In the embodiment illustrated in FIG. 7, both the first group of positive electrode current collection tabs 7A and the second group of positive electrode current collection tabs 7B have three positive electrode current collection tabs.

Figure 8:
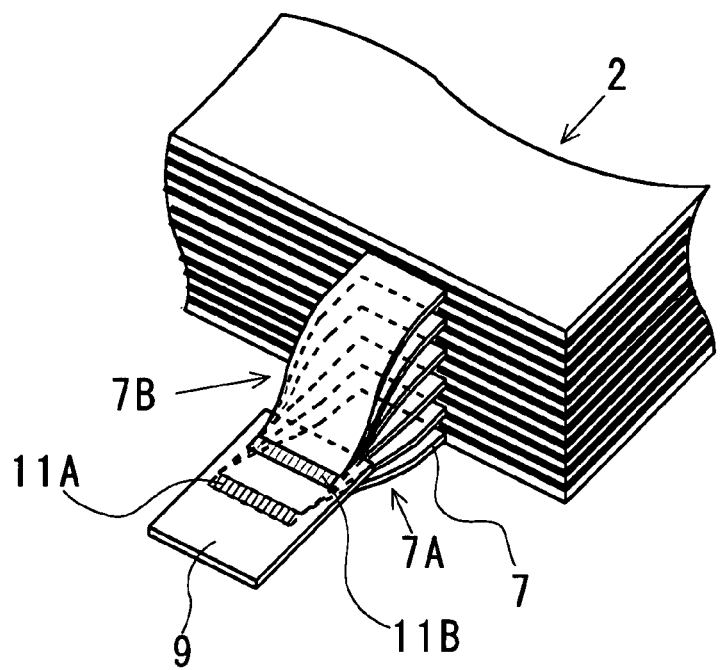
FIG. 8 is a schematic perspective view of the sixth embodiment of a stacked battery, illustrating the connection structure of the current collection tabs and the lead terminals.

FIG. 8 is a schematic perspective view of part of the sixth embodiment of a stacked battery, illustrating the connection structure of the positive electrode current collection tabs and the positive electrode lead terminal.

The first group of positive electrode current collection tabs 7A and the second group of positive electrode current collection tabs 7B are bonded to one of the both surfaces of the positive electrode lead terminal 9 and separated from each other by a gap in the fifth embodiment. On the other hand, the positive electrode lead terminal 9 is provided with junctions 11A, 11B on the both surfaces thereof and the two groups are bonded to the positive electrode lead terminal 9 at the respective junctions 11A, 11B. It is preferable that the projections of the junctions 11A and 11B to the surfaces of the positive electrode lead terminal are not laid one on the other.

In the instance of FIG. 8, the first group of positive electrode current collection tabs 7A having three positive electrode current collection tabs 7 is bonded to one of the both surfaces of the positive electrode lead terminal 9 at the junction 11A and subsequently the second group of positive electrode current collection tabs 7B also having three positive electrode current collection tabs 7 is bonded to the other surfaces of the positive electrode lead terminal 9 at the junction 11B. It is preferable that the projections of the junctions 11A and 11B to the surfaces of the positive electrode lead terminal 9 are not laid one on the other.

The groups of positive electrode current collection tabs is not limited to the first group of positive electrode current collection tabs and the second group of positive electrode current collection tabs as illustrated above and a stacked member having more groups of positive electrode current collection tabs can be applied to a battery having a large number of stacked members by arranging so many junctions alternately on the both surfaces of the positive electrode lead terminal in such a way that the projections of the junctions are not laid one on the other.

The lengths of the positive electrode current collection tabs 7 drawn out from the respective positive electrodes to the junctions 11A, 11B are not particularly considered in the above-described embodiments. To the contrary, the lengths of the positive electrode current collection tabs are taken into consideration in the seventh embodiment, which will be described below.

Figure 9:
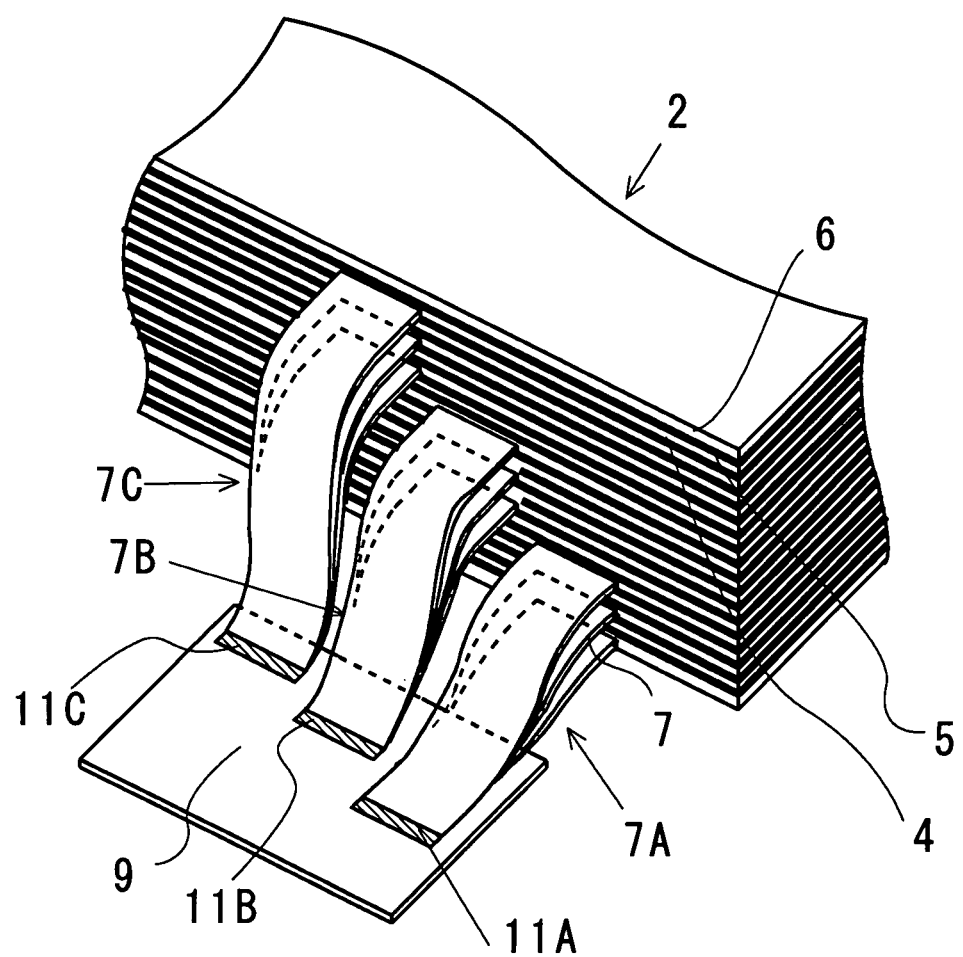
FIG. 9 is a schematic perspective view of the seventh embodiment of stacked battery, illustrating the connection structure of the current collection tabs and the lead terminals.

FIG. 9 is a schematic perspective view of the seventh embodiment of a stacked battery, illustrating the connection structure of the positive electrode current collection tabs and the positive electrode lead terminal.

The lengths of the positive electrode current collection tabs 7A, 7B and 7C drawn out from the respective positive electrode 4 are equal to each other but bonded to the respective junctions 11A, 11B and 11C arranged at positions on the positive electrode timeline 9 that are separated from the stacked member 2 by respective distances that are different from each other.

The positive electrode current collection tabs of this embodiment show a uniform impedance so that the electric characteristics of each of the positive electrode current collection tabs and those of each of the negative electrode current collection tabs are well balanced in this embodiment.

Now, the lead terminals that are used in embodiments of the present invention will be described below.

Figure 10:
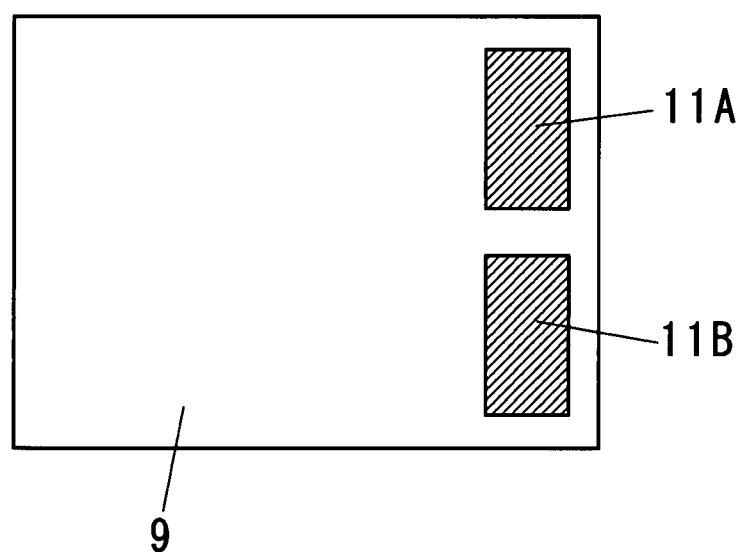
FIG. 10 is a schematic plan view of a lead terminal of an embodiment according to the present invention, illustrating the profile thereof.
Figure 11A:
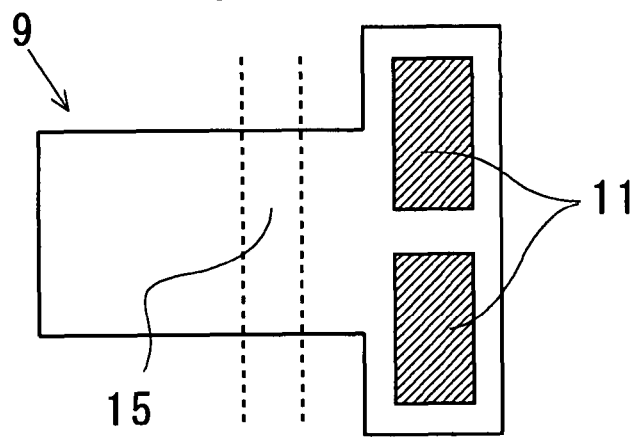
FIGS. 11A through 11C are schematic illustrations of possible profiles of lead terminals of other embodiments according to the present invention.
Figure 11B:
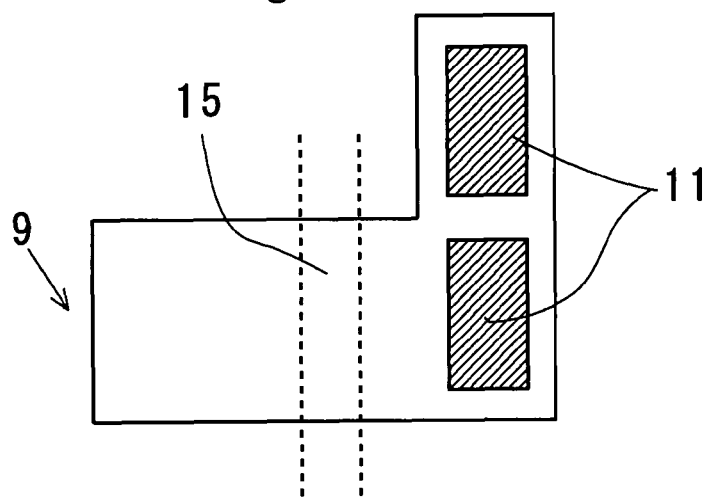
Figure 11C:
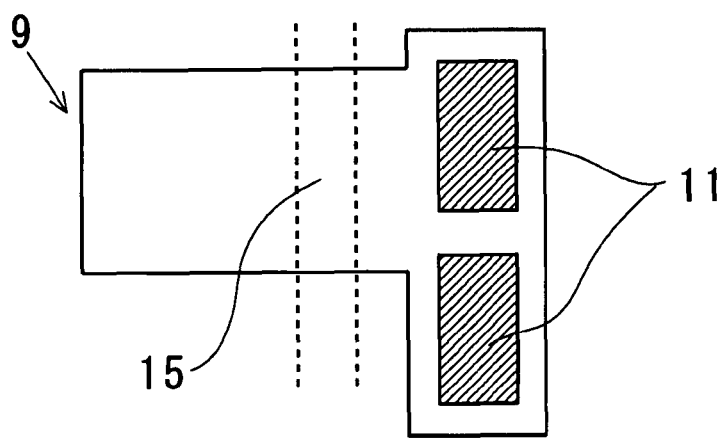

FIG. 10 is a schematic plan view of a lead terminal of an embodiment according to the present invention, illustrating the profile thereof. FIGS. 11A through 11C are schematic illustrations of possible profiles of lead terminals of other embodiments according to the present invention. The illustrated lead terminals will be described below as so many positive electrode lead terminals.

The positive electrode lead terminal of each of the first through third embodiments of the present invention may take any desired one of the profiles illustrated in FIGS. 10 and 11A through 11C.

The lead terminal illustrated in FIG. 10 has two junctions 11A, 11B arranged side by side, each having a width good for welding the corresponding current collection tabs. The positive electrode lead terminal 9 is made wide to accommodate the two junctions that are arranged side by side. The positive electrode lead terminal has a uniform width in the sense of a direction perpendicular to the direction in which the current collection tabs of the positive electrode lead terminal are drawn out. The current capacity of the stacked battery can be increased with this arrangement.

Each of the positive electrode lead terminals 9 illustrated in FIGS. 11A through 11C has a part where junctions 11 of current collection tabs are formed that is made to have broadened width, whereas the part 15 sealed by a flexible film casing is made to have a narrowed width. The sealing characteristics can be improved by this arrangement.

FIG. 11A shows a T-shaped profile and FIG. 11B shows an L-shaped profile, whereas FIG. 11C shows an asymmetrically T-shaped profile. Any of these profiles may be selected depending on the profile of the stacked battery.

When positive electrode current collection tabs and negative electrode current collection tabs are bonded respectively to a positive electrode lead terminal and a negative electrode lead terminal typically by ultrasonic welding for a stacked battery according to the present invention, proper bonding conditions are defined for a predetermined number of positive electrode current collection tabs or negative electrode current collection tabs. Therefore, when bonding a large number of current collection tabs, it is possible to produce highly reliable junctions by shifting the welding positions of the current collection tabs and bonding them under the predefined bonding conditions.

Figure 12A:
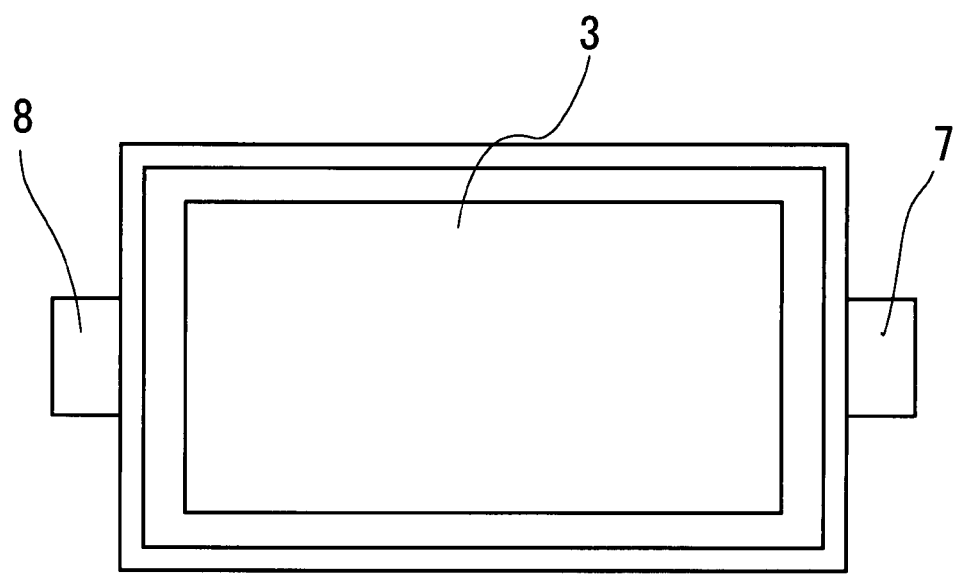
FIG. 12A is a schematic plan view of another embodiment of a stacked battery according to the present invention and FIG. 12B is a schematic lateral view of the embodiment.
Figure 12B:
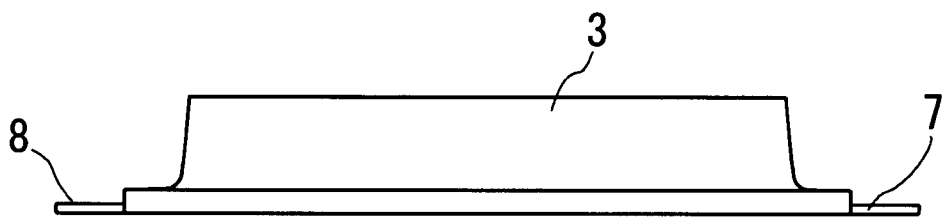
Figure 13A:
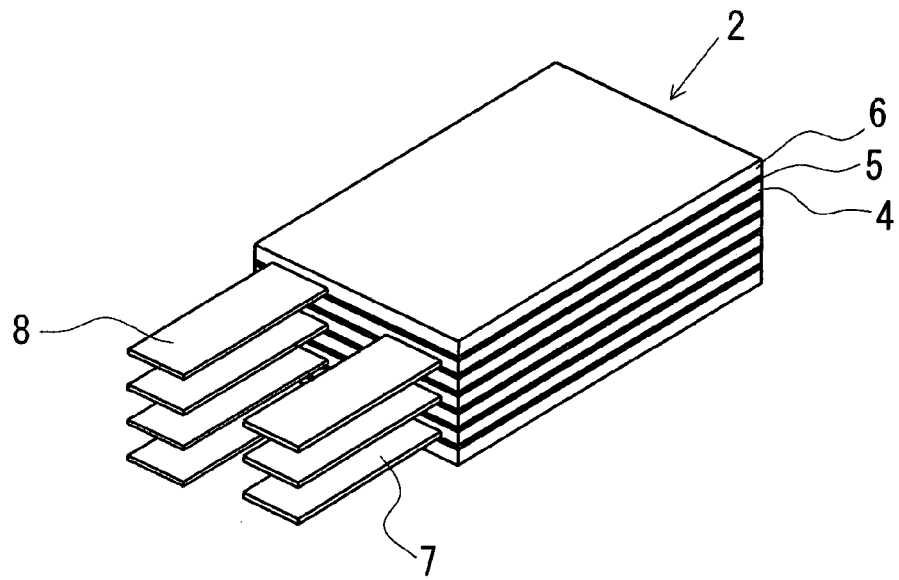
FIG. 13A is a schematic perspective view of a known stacked lithium-ion battery before being covered by a flexible film casing and FIG. 13B is a schematic perspective view similar to FIG. 13A, illustrating the condition after welding the current collection tabs and the lead terminals.
Figure 13B:
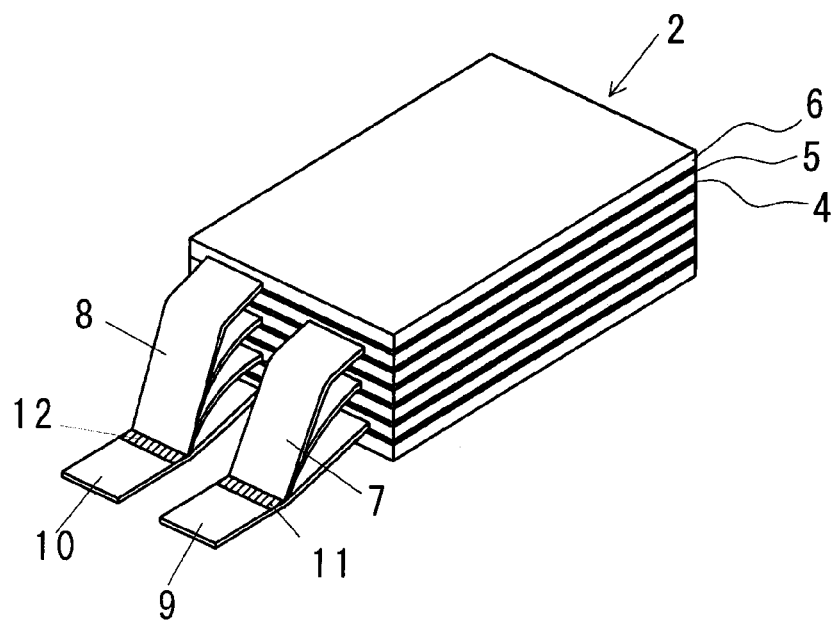

The positive electrode lead terminal and the negative electrode lead terminal are arranged at a side of the stacked member in the above description. However, the present invention is equally applicable to a stacked battery where the positive electrode lead terminal 9 and the negative electrode lead terminal 10 are drawn out respectively from the opposite end facets of the stacked battery 1 as shown in FIGS. 12A and 12B, of which FIG. 12A is a plan view and FIG. 12B is a lateral view.

What is claimed is:

1. A method for production of a stacked battery having a plurality of positive electrode current collection tabs and a plurality of negative electrode current collection tabs drawn out from a stacked member formed by laying positive electrodes and negative electrodes alternately one on the other with separators interposed between them and bonded respectively to a positive lead terminal and a negative lead terminal, the method comprising:

a step of determining in advance a simultaneously bondable number, or the number of positive electrode current collection tabs or the number of negative electrode current collection tabs that can be laid one on the other and collectively bonded, and bonding conditions for bonding them; and a step of forming groups of positive current collection tabs or negative current collection tabs, each group being formed by laying a number of current collection tabs not exceeding the simultaneously bondable number one on the other, displacing the bonding positions of the groups of positive electrode current collection tabs or those of negative electrode current collection tabs relative to each other in the direction of drawing out the positive electrode current collection tabs or the negative electrode current collection tabs, and collectively bonding all of the positive electrode current collection tabs or all of the negative electrode current collection tabs of each group under the bonding conditions, and the junctions of the groups of positive electrode current collection tabs or the groups of negative electrode current collection tabs and the positive electrode lead terminal or the negative electrode lead terminal, are arranged with spaced apart from each other from the stacked member on the surface of the positive electrode lead terminal or the negative electrode lead terminal, without displacing the positions in the direction perpendicular to the directions of drawing out the positive electrode current collection tabs or the negative electrode current collection tabs, of the groups and the groups of positive electrode current collection tabs or the groups of negative electrode current collection tabs, are bonded sequentially in the order of closeness to the positive electrode lead terminal surface or the negative electrode lead terminal surface, as viewed from the side close to toward the side remote from the stacked member.

2. The method according to claim 1, wherein
the number of positive electrode current collection tabs or negative electrode current collection tabs for forming a group is determined independently for positive electrode current collection tabs and negative electrode current collection tabs depending on their respective materials and profiles.

3. The method according to claim 1, wherein
each group is formed by taking out every other or every plural number of positive electrode current collection tab or negative electrode current collection tab in the stacked direction of the stacked member.

4. The method according to claim 1, wherein a plurality of junctions are formed on the positive electrode lead terminal or the negative electrode lead terminal in a direction perpendicular to the direction of drawing out the positive electrode current collection tabs or the negative electrode current collection tabs, and width of the positive electrode lead terminal or the negative electrode lead terminal, at the stacked member side thereof is same as the width of the outer surface of the battery.

* * * * *